(12) United States Patent
Wang et al.

(10) Patent No.: US 6,621,039 B2
(45) Date of Patent: Sep. 16, 2003

(54) METHOD AND APPARATUS FOR CREATING A FREE-FORM THREE-DIMENSIONAL METAL PART USING HIGH-TEMPERATURE DIRECT LASER MELTING

(75) Inventors: XinHua Wang, Singapore (SG); YunGan Wang, Singapore (SG); Kuak Choi Lealic Lim, Singapore (SG); Ying Hsi Jerry Fuh, Singapore (SG); Yoke San Wong, Singapore (SG); JiHuan Luo, Singapore (SG); HongBin Cheng, Singapore (SG); YueFeng Yu, Singapore (SG); XiangLin Zhang, Singapore (SG); YaXin Tang, Singapore (SG); Li Lu, Singapore (SG); Xuan Wang, Singapore (SG)

(73) Assignees: The National University of Singapore, Singapore (SG); Kinergy Pte. Ltd., Singapore (SG)

( * ) Notice: Subject to any disclaimer, the term of this patent is extended or adjusted under 35 U.S.C. 154(b) by 0 days.

(21) Appl. No.: 09/993,720

(22) Filed: Nov. 27, 2001

(65) Prior Publication Data

US 2002/0090313 A1 Jul. 11, 2002

Related U.S. Application Data

(60) Provisional application No. 60/253,198, filed on Nov. 27, 2000.

(51) Int. Cl.$^7$ ................................................ B23K 26/28
(52) U.S. Cl. ................................ 219/121.6; 219/121.63
(58) Field of Search ......................... 219/121.6, 121.63, 219/121.64, 121.65, 121.66, 121.8, 121.81, 121.83, 121.86; 419/10; 264/434, 113, 125

(56) References Cited

U.S. PATENT DOCUMENTS

| | | | |
|---|---|---|---|
| 4,863,538 A | 9/1989 | Deckard | |
| 4,938,816 A | 7/1990 | Beaman et al. | |
| 4,944,817 A | 7/1990 | Bourell et al. | |
| 5,147,587 A | 9/1992 | Marcus et al. | |
| 5,156,697 A | 10/1992 | Bourell et al. | |
| 5,182,170 A | 1/1993 | Marcus et al. | |
| 5,252,264 A | 10/1993 | Forderhase et al. | |
| 5,314,003 A | * 5/1994 | Mackay | 164/494 |
| 5,430,666 A | * 7/1995 | DeAngelis et al. | 250/491.1 |
| 6,042,774 A | 3/2000 | Wilkening et al. | |
| 6,441,338 B1 | * 8/2002 | Rabinovich | 219/121.64 |
| 6,519,500 B1 | * 2/2003 | White | 700/119 |

* cited by examiner

Primary Examiner—Tom Dunn
Assistant Examiner—Jonathan Johnson
(74) Attorney, Agent, or Firm—Birch, Stewart, Kolasch & Birch, LLP

(57) ABSTRACT

A computer-controlled apparatus and method for producing metallic parts by laser melting selected regions of a layer(s) of metal powder at a target area are disclosed. The system includes devices for preheating and maintaining a relatively high temperature, e.g. 400° C., of the metal powder so as to join the metal powder together with relatively low laser power, e.g. a 200W $CO_2$ laser. A major powder depositing mechanism with a scraper and a depositing system for a secondary powder are included in the apparatus that allows the powders to be delivered to the target area for selective melting. The metal powder is preheated at either a dispensing cylinder or the target area through thermal conduction and/or is also heated by a heating plate positioned above the platform through radiation. The corresponding machine structures, such as a motion system and a working chamber, are designed to be able to withstand and operated under the high temperature environment.

10 Claims, 18 Drawing Sheets

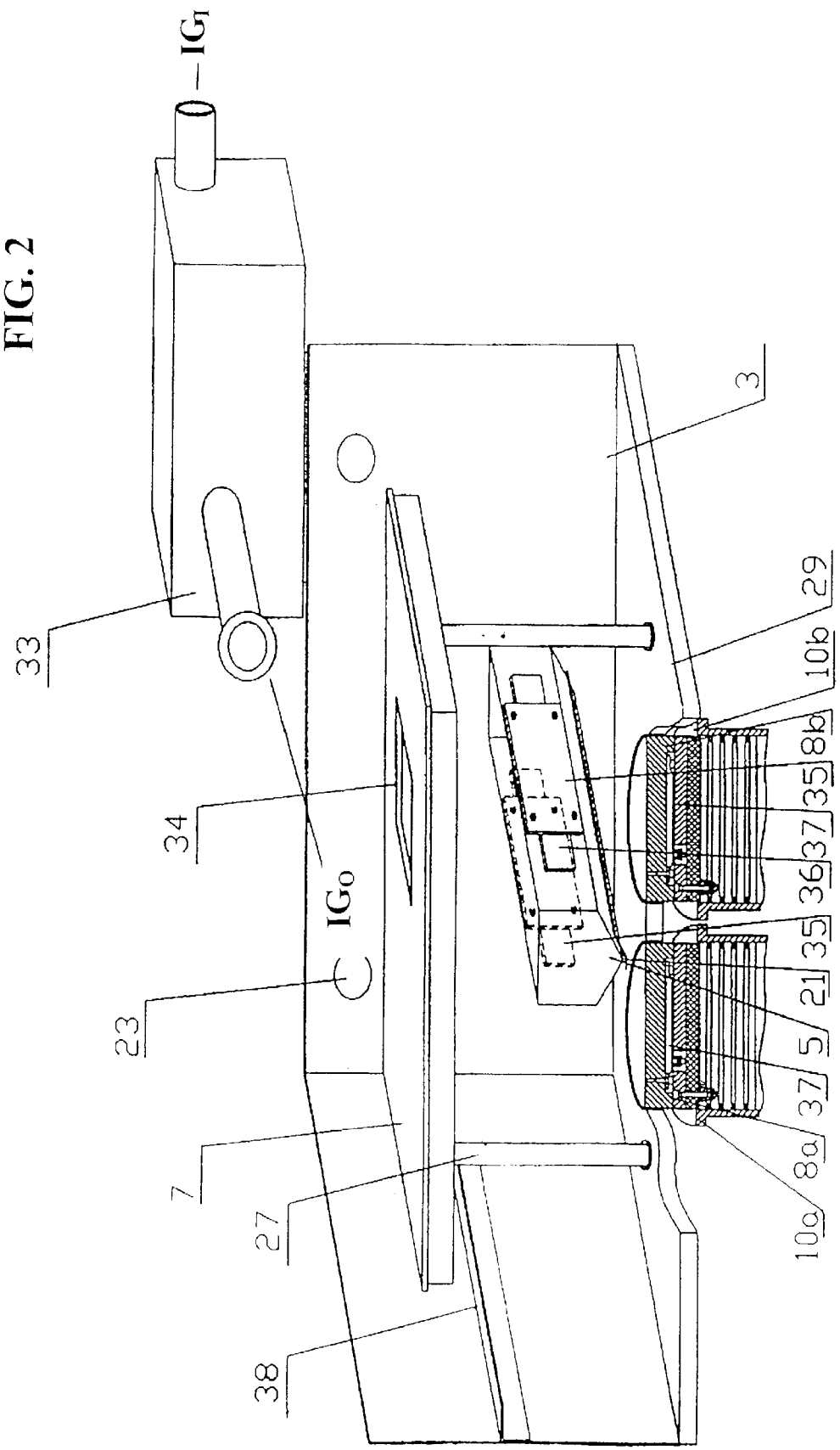

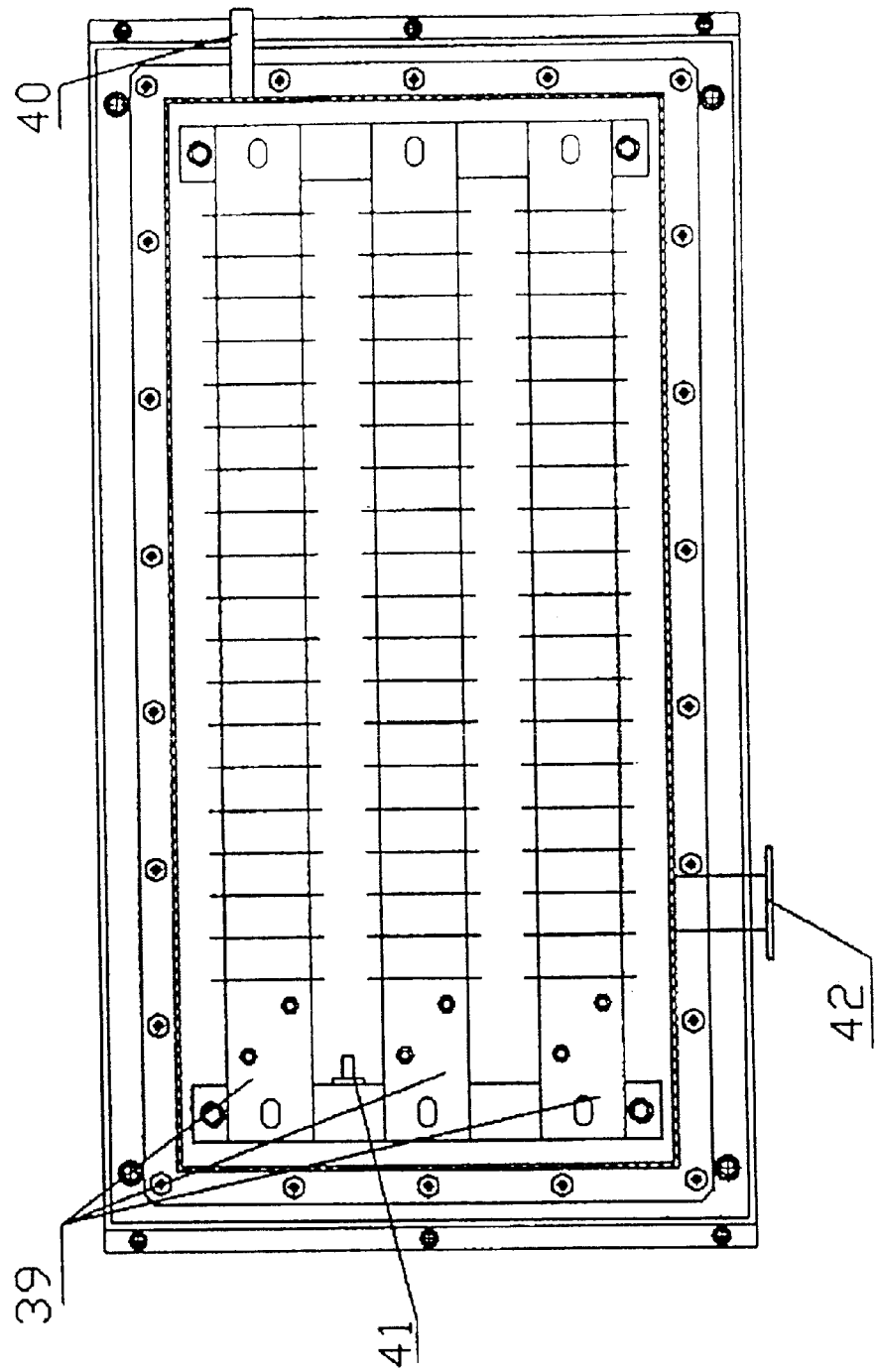

FIG. 6(a)
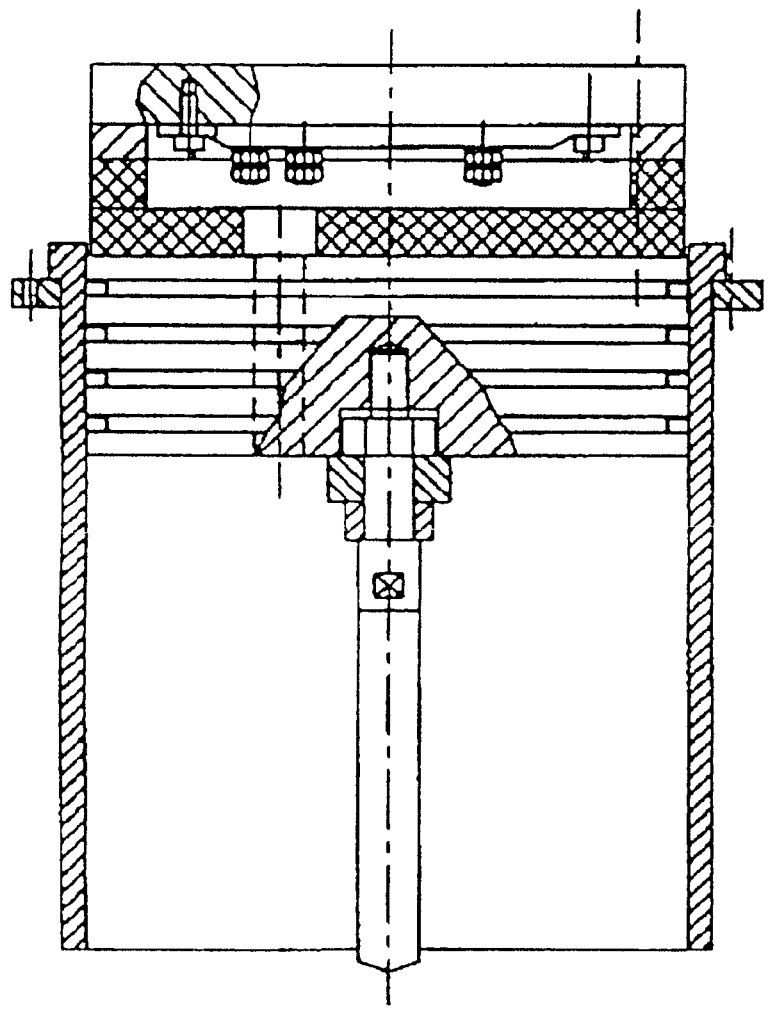
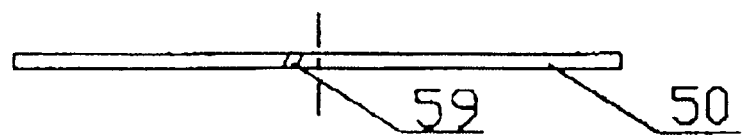

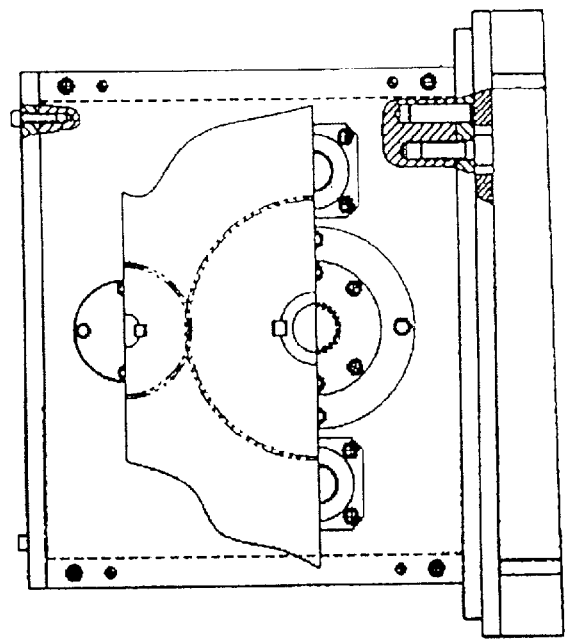
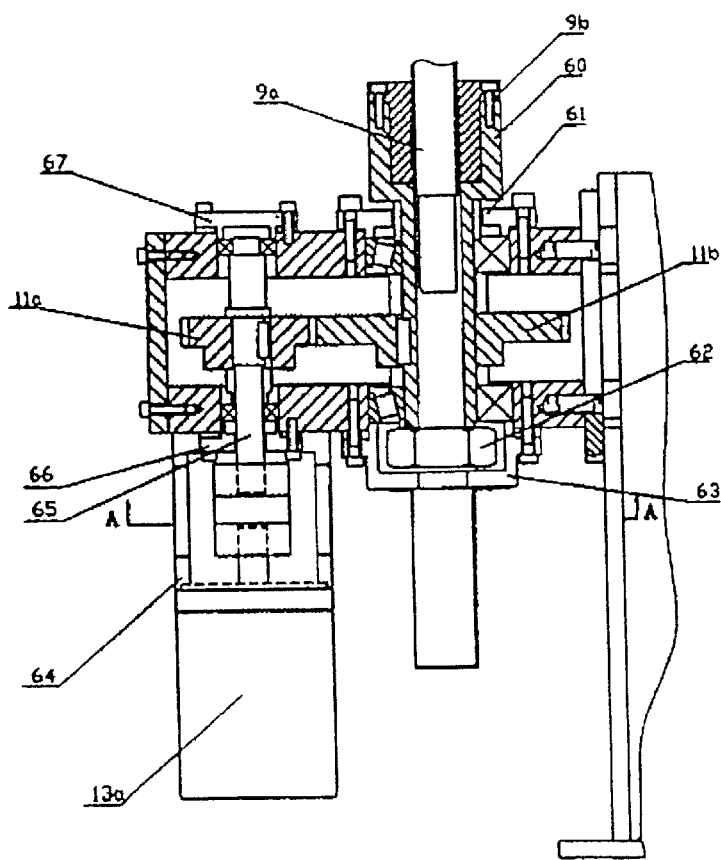
FIG. 7(a)

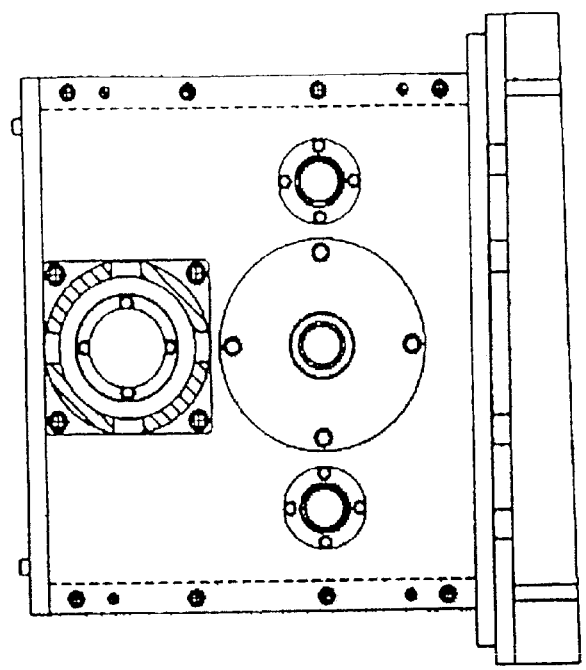
FIG. 7(b)
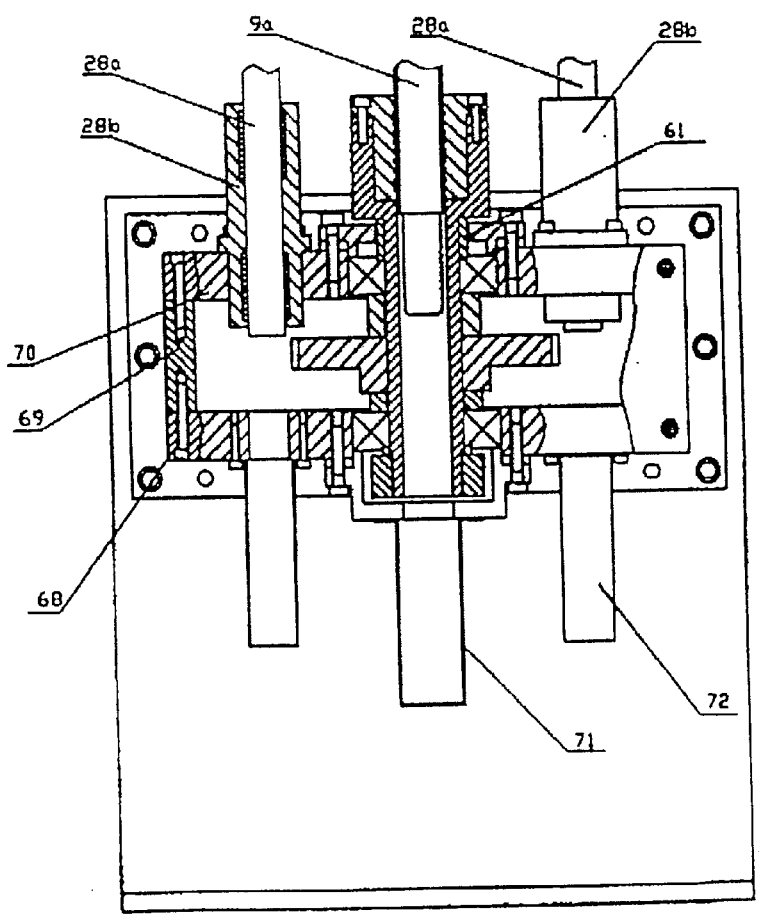

METHOD AND APPARATUS FOR CREATING A FREE-FORM THREE-DIMENSIONAL METAL PART USING HIGH-TEMPERATURE DIRECT LASER MELTING

CROSS-REFERENCES TO RELATED APPLICATIONS

This application claims priority on provisional application No. 60/253,198 filed on Nov. 27, 2000, the entire contents of which are hereby incorporated by reference.

BACKGROUND OF THE INVENTION

1. Field of the Invention

The present invention relates generally to a method and apparatus for directly sintering metal powder, and more particularly to a method and apparatus for directly sintering metal powder on a work-space platform under a high temperature environment in a layer by layer manner. The present invention relates to a method and apparatus that is capable of producing composite parts with two types of material.

2. Description of the Background Art

Various methods have been proposed in the background art for forming three-dimensional objects by deposition of layers of material on a substrate. This layered manufacturing process is also known as solid free-form fabrication (SFF) or rapid prototyping (RP). Various materials and combinations of materials can be processed according to this method, including materials such as plastics, waxes, metals, ceramics, and the like. U.S. Pat. No. 5,252,264 to Foderhase et al. describes an example of this type of method and apparatus for producing prototype parts. Foderhase et al. describe a method and apparatus for producing prototype parts with multiple powder pistons by fusing selected portions of a layer of powder at a target area.

The RP technology has been successfully used to provide all kinds of prototypes, such as visual, functional, and production prototypes. However, RP techniques have limited impact if used solely for direct fabrication of prototypes. The advantages of RP, such as flexibility in free-form fabrication without geometric constraints, fast material processing time, and innovative joining techniques, have great potential in reducing time to fabricate a complex tooling. In the fiercely competitive market, RP techniques are applied on rapid tooling (RT) to shorten the lead-time of tooling preparation and to further reduce the time-to-market of a new product.

RT technology is typically categorized as either indirect rapid tooling or direct rapid tooling. Indirect rapid tooling processes start with a pattern made by the RP process, and a tooling is duplicated with the pattern by casting or spraying, etc. In direct tooling processes, a tooling is fabricated by the RP machine through sintering, bonding, curing, depositing, etc. without any intermediate steps. Among the metal powder forming processes, selective laser sintering (SLS), direct metal laser sintering (DMLS), and laser generating (LG) or laser engineered net shaping (LENS) are well known.

The SLS process has been developed by DTM Corporation of Austin. The system includes a 50W, $CO_2$ laser unit, a feed-powder cartridge, a laser scanning unit, a build-cylinder, and a powder feeder. In operation, a motor drives the powder feeder to a specified amount at which a volume of powder extends above a leveling plane. The feed-powder cartridge travels across the leveling plane and delivers the powder to the target area. In the target area, a laser beam is generated by laser apparatus and is deflected by galvanometer-controlled mirrors. The rotation of the mirror is controlled by a computer corresponding to the cross-section of the layer of the part to be produced. When a layer of the part is produced, the powder will be selectively fused. Once a layer is finished, the process is repeated until the part is built up, layer by layer.

U.S. Pat. No. 4,863,538 issued on Sep. 5, 1989 to Deckard; U.S. Pat. No. 4,938,816 issued on Jul. 3, 1990 to Beaman et al.; U.S. Pat. No. 4,944,817 issued on Jul. 31, 1990 to Bourell et al.; PCT publication WO 88/02677 published on Apr. 21, 1998; U.S. Pat. No. 5,147,587 issued on Sep. 15, 1992 to Marcus et al.; U.S. Pat. No. 5,156,697 issued on Oct. 20, 1992 to Bourell et al.; and U.S. Pat. No. 5,182,170 issued on Jan. 26, 1993 to Marcus et al. all describe detailed, exemplary method and apparatus of the process described hereinabove; the entirety of each of which is herein incorporated by reference.

Several kinds of material with powder form, such as polymer, nylon and metal, are often used in the SLS system. The tooling materials available are Copper Polyamide and Rapid Steel. Rapid Steel 2.0 is a polymer-coated stainless steel powder. It can be used to create tooling for the bridge or pre-production injection molding. A binder melted during laser sintering holds the stainless steel powder together. In a Rapid Steel process, only polymer-binder is melted. The metal does not melt by the laser during the sintering because the laser energy, e.g., 50W, is not high enough to heat the powder up to the melting point of the metal.

After all layers are scanned, the insert is prepared for the first furnace cycle, as the mold insert created is now a green part. During the first furnace cycle, the binder decomposes and the steel powder sinters to form small necks (or bridges) between particles. The resulting part, which is 60% dense, is called a "brown" insert and is much more durable than the green insert. The brown part is placed in a crucible and a measured amount of bronze is placed next to the part. The crucible is then placed in the furnace for the second furnace cycle. The bronze melts and wicks into the brown part by capillary action, forming the infiltrated part. The resulting mold inserts are therefore fully dense. However, the post-process procedure is extremely time consuming and involves considerable effort.

In mid-1998, DTM introduced Copper Polyamide (PA), a heat resistant, thermally conductive composite of copper and plastic that can be used to create tooling for short runs of production equivalent plastic parts. In operation, the metal powder of copper does not melt. Instead, the plastic composite fuses to bond the powder together.

DMLS is another metal laser forming process developed by Electro Optics Systems (EOS) of Munich in Germany. Commercialized machine, EOSINT M machine, has been developed and commercialized since 1995. The machine consists of a 200 W, $CO_2$ laser unit, a laser scanning unit, a building platform, and a scraper assembly. The building process is similar to an SLS process. An exemplary method and apparatus are further described in U.S. Pat. No. 6,042,774, issued in Mar. 28, 2000 to Wilkening et al, the entirety of which is herein incorporated by reference.

A metal powder often used in EOSINT is a mixture of bronze, nickel, and copper-phosphide. In this powder, copper-phosphide melts at 660° C. and acts as the low temperature-binding agent. When the laser beam exposes on the powder, bronze and nickel powders homogenize at high temperature. Copper-phosphide powder melts, and the liquid phase penetrates the surrounding cavities, wets the bronze/nickel particles and bonds the particles together. After sintering, the part density is about 70% of the theoretical density of the material.

Based on the well-known laser cladding process (Hoadley and Drezet, 1991), the laser generating (LG) method was developed at the Technische Hochschule in Aachen as "laser-aided powder solidification" (LAPS) (Kreutz et al., 1995), in the Los Alamos National Laboratory as "directed light fabrication" (DLF) (Lewis, 1995), and at Sandia Laboratories as "laser engineered net shaping" (LENS). In LENS at Sandia Laboratories, the system uses a robotically controlled laser to melt metal powder to create custom parts in a special chamber. The chamber is purged with argon, which acts as a protective atmosphere for the powder metals during the melting process.

Operating inside the chamber is a six-axis robot programmed to go through the motions necessary to build a particular part. The powder metal is fed through a cable to the articulated arm of the robot. Simultaneously, a laser beam travels through a fiber optic cable to deliver energy. LG is the only RT technique able to directly produce filly dense parts (N. P. Karapatis et al. 1998).

However, the required laser power and beam quality are usually high, e.g. the laser power is normally higher than 1 kW. In addition, the process itself induces high thermal stresses that can lead to part failure. Geometric accuracy and part stability are difficult to generate because of the lack of supporting material. Geometry of the parts is often limited to rather simple shapes. Due to applying high power and laser quality, as well as complicated mechanical structure for powder and laser delivery, the LENS system is more expensive than an SLS system (R. Irving, 1999).

All of these systems are demonstrative of attempts to generate three-dimensional objects using metal powder through laser sintering. However, numerous problems, such as low density of the part fabricated in SLS and EOS system, distortion, geometric limitation and the high costs of the LENS system, have limited the practical application of these systems.

The aforementioned discussion of the background art included several references to a variety of references acknowledged only by their author(s) and publication date. The following bibliographic description of these references is provided hereinafter, the entirety of each of which is herein incorporated by reference. Hoadley, A. and Drezet, J. M. (1991), "Modelisation thermique de la refusion et du traitement de surface par laser, Lasers de puissance et traitement des materiaux," *Ecole de Printemps,* Sireuil, France, May 28–31, 1991; Kreutz, E. W., Backes, G., Gasser, A. and Wissebach, K., "Rapid prototyping With $CO_2$ laser radiation", *Applied Surface Science,* Vol.86 No.1, (1995), pp 310–316; Lewis, G. K., "Direct laser metal deposition process fabricates near-net-shape components rapidly," *Materials Technology,* Vol. 10, (1995), pp3–4; N. P. Karapatis et al., "Direct rapid tooling: a review of current research," *Rapid Prototyping Journal,* Vol. 4,No. 2, (1998), pp 77–89; and Robert Irving, "Taking a powder," *Mechanical Engineering,* Sep. 1999, pp55–59.

SUMMARY OF THE INVENTION

The present invention overcomes the shortcomings associated with the background art and achieves other advantages not realized by the background art.

An object of the present invention is to improve production efficiency and product density during the production of three dimensional, layered products.

An object of the present invention is to provide controlled, reliable part production of components from more than one material and within a high production temperature environment.

These and other objects are accomplished by a method for producing a desired, three dimensional metallic part, comprising the steps of heating a part production apparatus to a setting temperature; maintaining the setting temperature during a fabrication period; depositing a powder onto a target surface, the powder comprising first and second materials; accurately controlling a layer thickness; preventing the powder from leaking from a primary powder container under a high temperature environment; and sintering a selected portion of the powder corresponding to a relative cross-sectional region of the desired part.

These and other objects are further accomplished by a sintering apparatus for producing a three dimensional metallic part from at least one metallic powder, the sintering apparatus comprising a laser for selectively melting the at least one metallic powder; a scanner head mounted along a laser beam travel path, the scanner head focusing and directing a laser beam; a working chamber for high temperature sintering of the at least one metallic powder; an airtight chamber for maintaining an inert gas seal, the airtight chamber enclosing the working chamber; a secondary powder container; a scraper for delivering the at least one metallic powder to a target area; a heating system for heating the apparatus to a setting temperature; a cylinder and piston assembly for dispensing and building the at least one metallic powder to form the metallic part; and means for controlling the sintering apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIG. 2 shows a perspective exploded view of a heating system according to an embodiment of the present invention;

FIGS. 7(a)–7(b) show the specially designed motion system which drives a piston moving up and down within a cylinder according to an embodiment of the present invention.

DETAILED DESCRIPTION OF THE PREFERRED EMBODIMENT

Figure 1A:
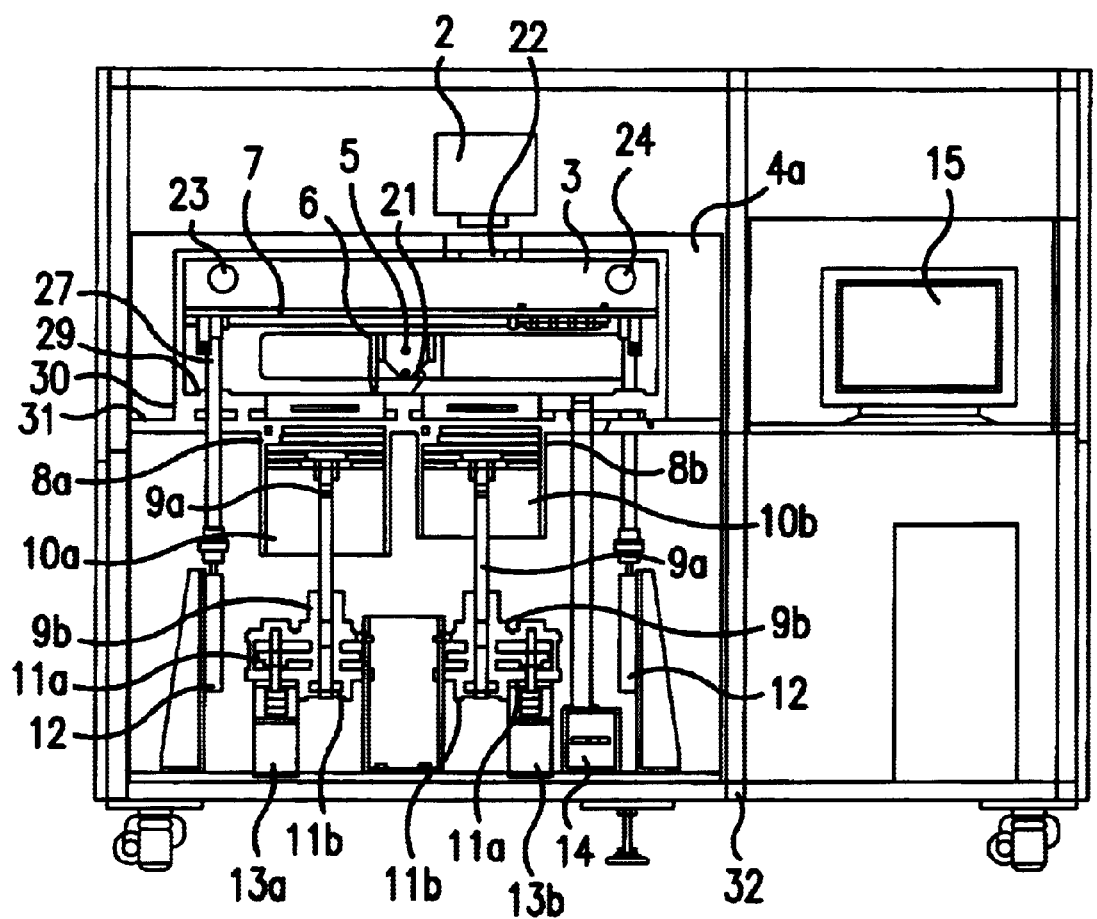
FIGS. 1(*a*)–1(*c*) show assembly views of an apparatus for producing parts according to a preferred embodiment of the invention.
Figure 1B:
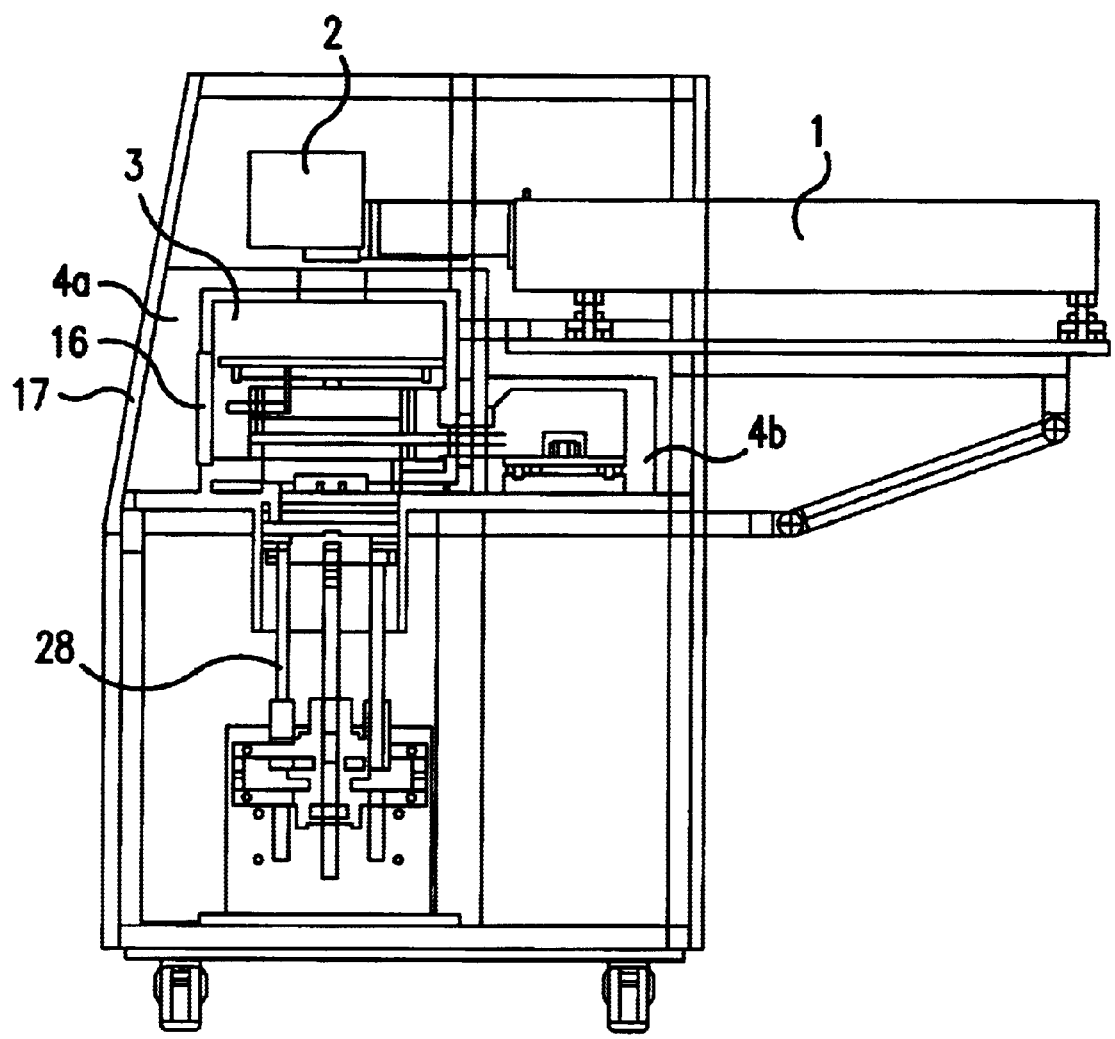
Figure 1C:
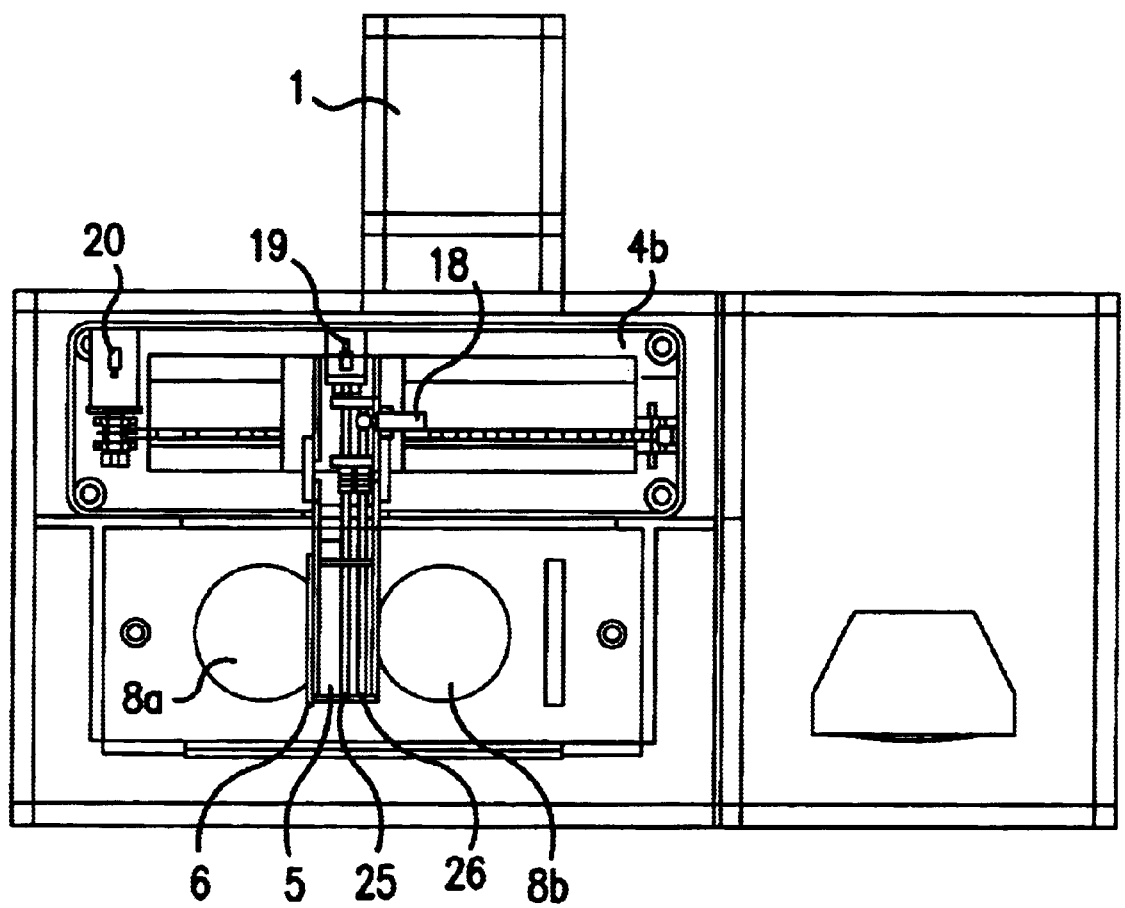
Figure 3B:
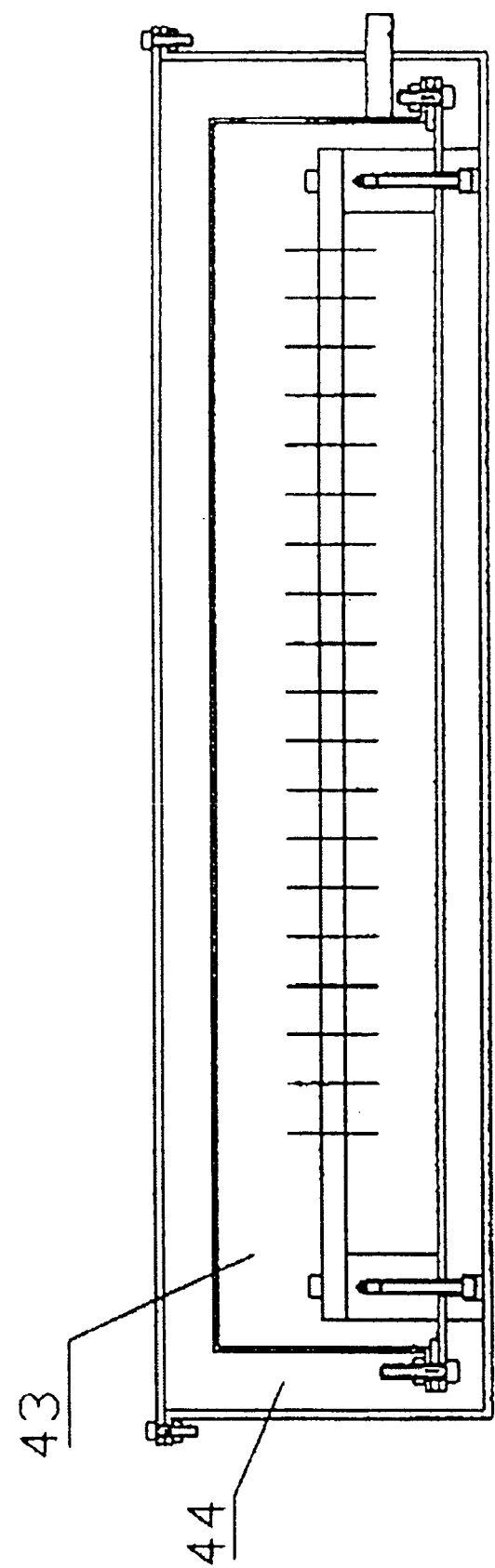
FIGS. 3(*a*)–3(*c*) show multiple views of a heating box for inert gas going through and into a working chamber according to an embodiment of the present invention.
Figure 3C:
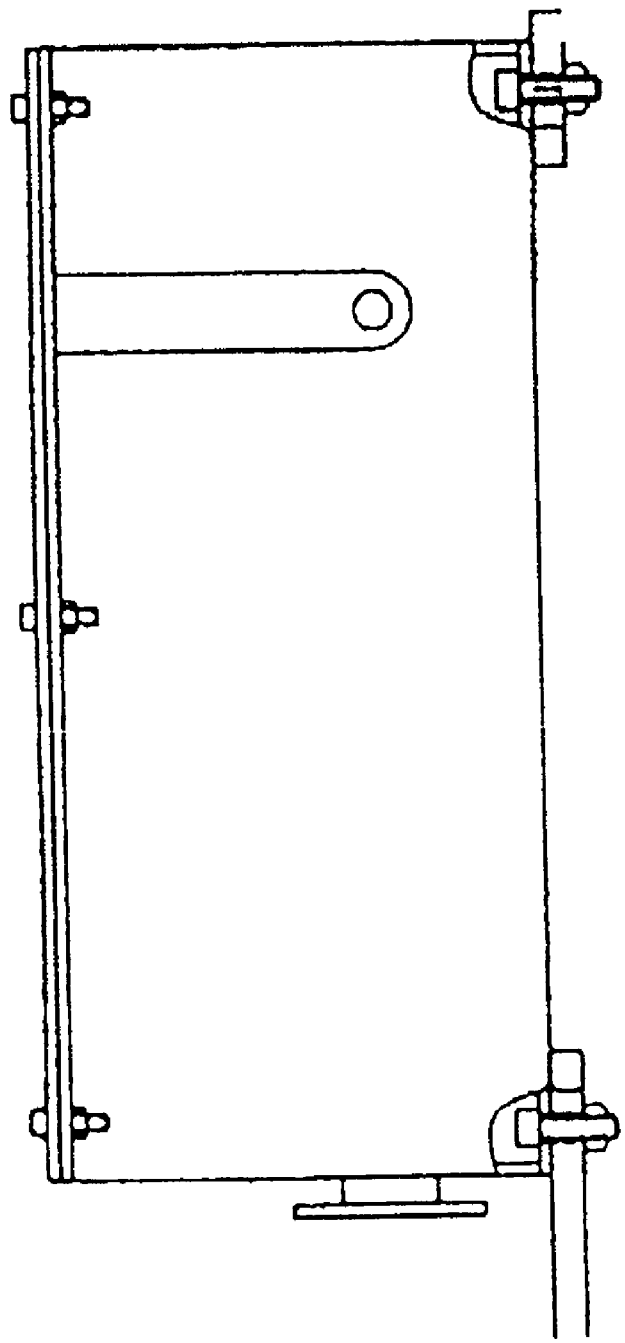
Figure 4A:
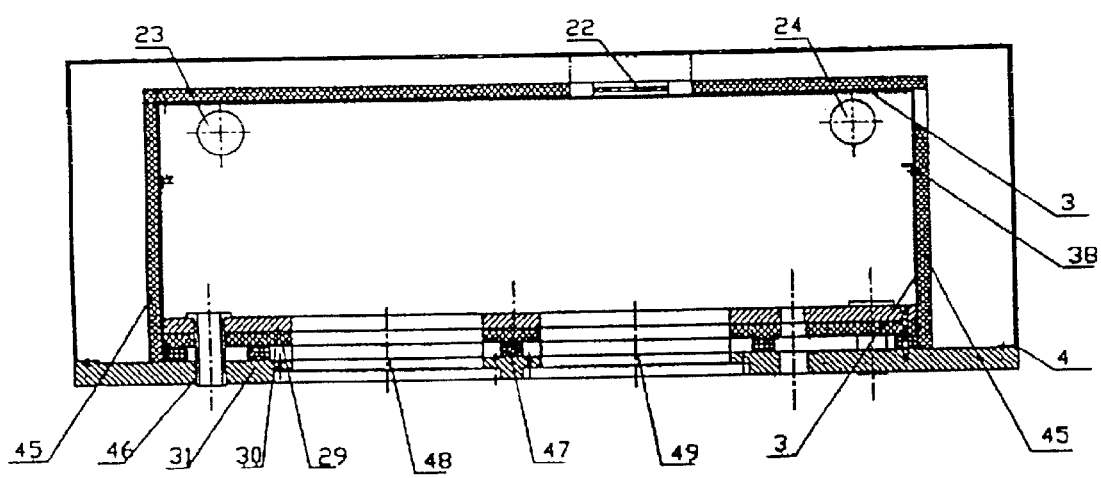
FIGS. 4(*a*)–4(*c*) show detailed views of a working chamber and an air-tight chamber according to an embodiment of the present invention.
Figure 4B:
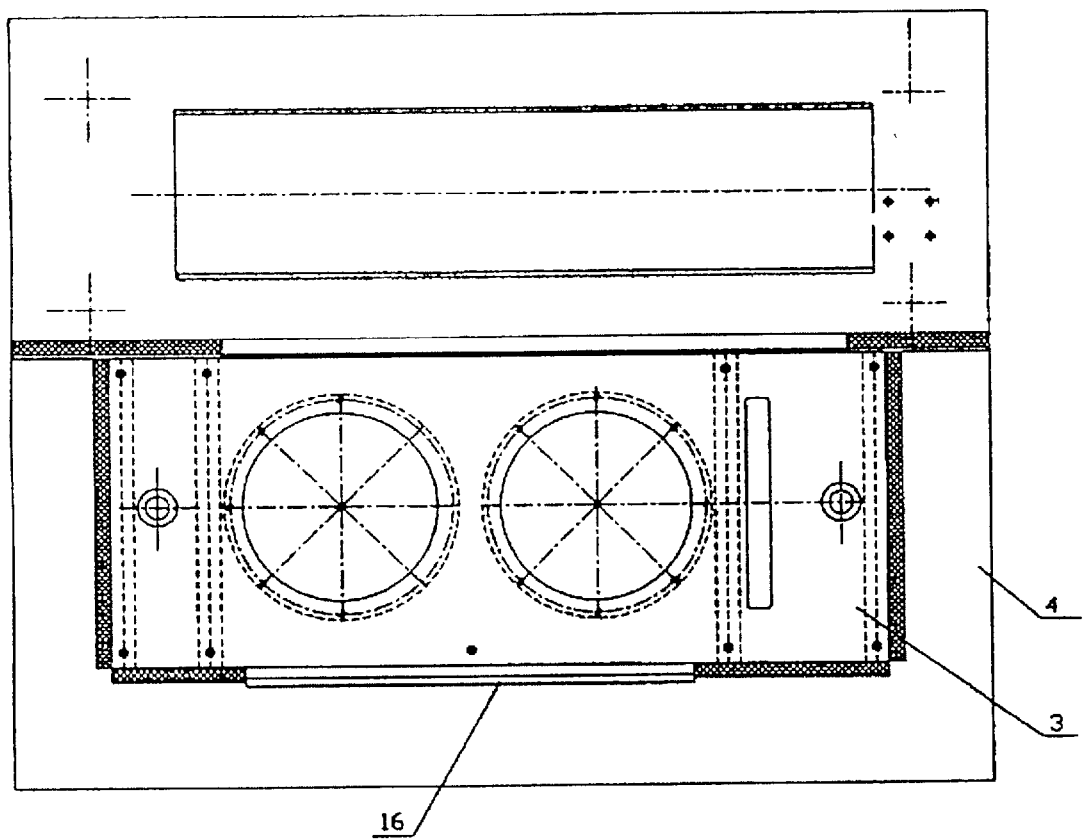
Figure 4C:
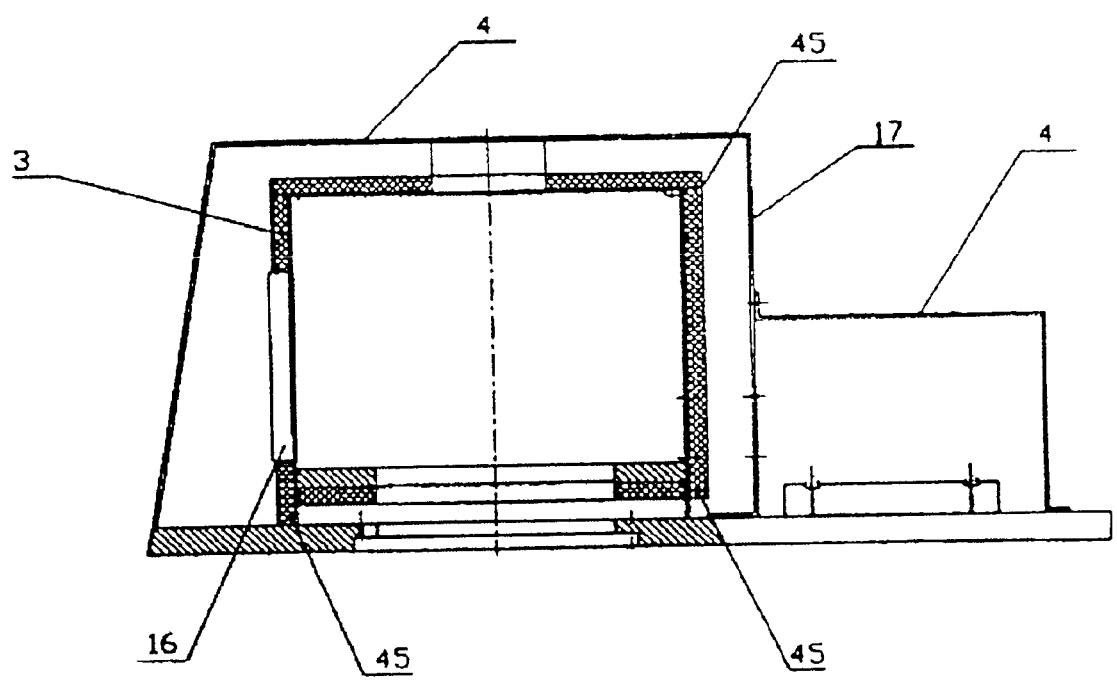

The present invention will hereinafter be described with reference to the accompanying drawings. FIGS. 1(a)–1(c) show assembly views of an apparatus for producing parts according to a preferred embodiment of the invention. FIG. 2 shows a perspective exploded view of a heating system according to an embodiment of the present invention. FIGS. 3(a)–3(c) show multiple views of a heating box for inert gas going through and into a working chamber according to an embodiment of the present invention. FIGS. 4(a)–4(c) show detailed views of a working chamber and an air-tight chamber according to an embodiment of the present invention. FIGS. 5(a)–5(d) show detailed views of the assembly of a feeding system and a dispensing mechanism for secondary powder according to an embodiment of the present invention. FIGS. 6(a)–6(c) show detailed views of a piston assembly according to an embodiment of the present invention. FIGS. 7(a)–7(b) show the specially designed motion system which drives a piston moving up and down within a cylinder according to an embodiment of the present invention.

FIGS. 1(a)–1(c) show assembly views of an apparatus for producing parts according to a preferred embodiment of the invention. An apparatus for producing 3-D parts will be described in further detail hereinafter. FIG. 1(a) is a frontal view of the apparatus, FIG. 1(b) is a side view and FIG. 1(c) is a top view of the apparatus for producing parts. For ease of description and viewing, the system of FIGS. 1(a)–1(c) is illustrated in exploded fashion, without cover plates and the like. The apparatus includes a laser 1, a scanner head 2, a working chamber 3, air-tight chambers 4a and 4b, a secondary powder container 5, a scraper 6, a radiant heating plate 7, a dispensing cylinder 10a, a building cylinder 10b, and a personal computer 15.

The laser 1 is shown somewhat schematically in FIG. 1. A $CO_2$ laser is used which can operate in a continuous mode with approximately two hundred watts maximum outlet power. The laser beam output of the laser 1 has a wavelength of approximately 10590 nm, which is infrared. The laser 1 can be modulated on or off to selectively produce a laser beam. The output power can also be modulated with a selectable range of 0 to 200 watt. In this apparatus, the laser on or off and power output modulation are controlled by the personal computer 15. The laser can be selectively controlled via the computer 15 and in accordance with a CAD file containing detailed dimensions of the desired part and its associated cross-sections.

The scanner head 2 is mounted along the path of travel of the laser beam to focus and redirect the laser beam. The scanner head 2 includes a pair of mirrors driven by respective galvanometers. The computer 15 controls the galvanometers through a controller card. The controller card permits communication between the computer 15 and mirrors.

As shown in FIGS. 1(a)–1(c), working chamber 3 is a place where preheating, powder dispensing and sintering processes take place. The internal surface of the chamber 3 is made of stainless steel. The external surface of the chamber 3 is covered by thermal insulation material (mica, 20 mm thickness). On the top of the chamber 3, a round opening allows the laser beam to pass therethrough and to scan on the target area 8b. Chamber 4 is airtight, and inert gas is enclosed in it. Inert gas is put into the chamber 4 through inlet 23, and the air is purged out from the outlet 24. A special optical crystal, which prevents the lens of scanner head 2 from contamination, is mounted on the top of the chamber 4. The laser beam can go through the crystal with ignored energy loss.

The container 5 is for storing secondary powder. There is a shutter pot on the bottom of the container 5. A worm pole is inserted into the container 5 to mix the powder in the container 5 so as to be easily released. Step motor 20 drives the container 5 moving back and forth in the working chamber 3. The scraper 6 is mounted on the container 5. When the motor 20 drives the container 5, the scraper 6 can move back and forth to deliver the powder to target area 8b and level the powder surface.

As shown in FIGS. 1(a)–1(c), the radiant heating plate 7 is placed above leveling surface 29. The radiant heating plate 7 can be driven by gas cylinder 12 to move up and down. During the building process, the heating plate is located at the lower position so that the powder in dispensing cylinder 10a and building cylinder 10b can be heated effectively. After the building process, the heating plate 7 is pushed to the upper position by cylinder 12 so that the built part can be taken out easily.

Cylinders 10a and 10b house powder piston assemblies 8a and 8b. Servo motors 13a and 13b drive a ball screw unit (collectively, 9a and 9b) through a pair of gears 11a and 11b. Applying the ball screw unit (9a and 9b), rotation is converted to linear motion, and a screw shaft 9a drives the piston assemblies 8a and 8b moving up and down in the cylinders 10a and 10b.

The operation of a preferred embodiment of the present invention will be described in greater detail hereinafter with reference to the accompanying drawings. A fundamental concept of the present invention is the build up of a metal part directly in a layer-by-layer manner. That is, a STL file of a part is sliced into discrete layers having a certain thickness, which cumulatively comprise the three-dimensional configuration of the part. Each layer includes a two-dimensional cross-sectional contour of the part.

In operation, as shown in FIGS. 1(a)–1(c), as the piston unit 8a moves to the lower position, the cylinder 10a and container 5 are filled up with different powders. Doors 16 and 17 are closed. Heating components 7, 33, 36 and 37 (see FIG. 2) start working to heat the working chamber 3 and powders in the cylinder 10a and container 5 up to the setting temperature. Inert gas is conducted into the heating box through an inert gas inlet $IG_I$ and into the chamber 4 after preheating from the heating box 33 (see FIG. 2) through an inert gas outlet $IG_O$.

After the preparation described above, a building process starts. Dispensing piston 8a moves upward by a certain distance, and a first portion of powder is lifted higher than the leveling surface 29. The target piston 8b moves downward with a certain distance so as to house the powder that will be delivered. The scraper 6 driven by step motor 20 sweeps from a left side of the apparatus to a right side and spreads the first portion of powder on the target area 8b. Corresponding to the first cross-sectional region of the desired part, the personal computer 15 controls the laser beam to selectively scan only the deposited powder within the confines of the defined boundaries. With the help of heating components, the laser beam heats the powder so as to melt, and the powder is joined together. The first sintered layer is then finished.

When a secondary powder is involved in the part production, dispensing of the secondary powder is described as follows. The secondary powder container 5 moves to the middle position between the dispensing cylinder 8a and target cylinder 8b (the current position shown in FIG. 1) and stops. Gas cylinder 18 drives the shutter 21 on the outlet of the container 5 open, and motor 19 drives the rotating worm shaft 25. The secondary powder in the container 5 is released and drops on the leveling surface 29.

When the amount of powder is sufficient enough to dispense to the target area 8b for one layer, the gas cylinder 18 drives the shutter 21 closed. The scraper 6 is fixed on the container 5. When the step motor 20 moves the container 5, the scraper 6 moves with the container 5 together and sweeps over the leveling surface 29. The secondary powder released from the container 5 is spread onto the target area 8b. The laser beam selectively melts the powder according to the cross-section of the desired part. After completion of the selective melting for that particular layer of powder, the target piston 8b moves downward by an amount corresponding to the thickness of the next layer, and awaits the deposition of the next layer of powder from scraper 6.

FIG. 2 shows a perspective exploded view of a heating system according to an embodiment of the present invention. The heating system shown provides preheating for metal powder and ensures the temperature of the metal powder reaches to 400° C. prior to sintering. FIG. 2 schematically illustrates the preferred heating system of the present invention. The objective of the presented apparatus is melting metal powder directly.

Metals commonly used in the preferred apparatus are nickel, copper, and iron, etc. The melting point of these materials is usually higher than 1000° C. Using only the 200 W laser power, it is difficult to heat powder to such high temperatures. Scanning at a slow speed is one way to focus more energy on the powder so as to melt it. However, it sacrifices the production time and efficiency. A preferred alternative uniquely applicable to the present invention is the application of subsidiary heating components to heat the powder to a certain temperature prior to sintering. When laser energy is added, the powder can be heated up to the melting point.

In the present apparatus, the powder is expected to heat up to a temperature of 400° C. First, a 3000W radiant heating plate 7 is maintained in a hanging position over the leveling surface 29 to achieve the predetermined temperature. During the producing process, the heating plate 7 drops down by weight, and two stoppers 38 fixed on the wall of the working chamber 3 support the heating plate 7. The powder in cylinder 10a and 10b can absorb heat radiated by the heating plate 7. After completion of part production, gas cylinders 12 (shown in FIG. 1) controlled by computer 15 push the heating plate 7 upwardly so that the produced part can be removed easily.

Opening 34 on the heating plate 7 is meant for permitting the laser beam to pass through. However, with the opening 34 right above the target piston, it is disadvantageous for heating the powder in the target cylinder 10b. Therefore, strip heaters 37 are installed under the platform 8a and 8b to ensure the powder in the cylinders is heated to the required temperature.

Secondary powder in the container 5 absorbs heat in at least two ways. First, the radiant heating plate 7 radiates heat to the powder in the container 5. On the other hand, strip beaters 35 and 36 are installed on two sides of the container 5 to ensure the powder in container 5 is heated to the required temperature.

Inert gas, such as nitrogen, may be very cold when it is just released from the gas cylinder. If a cold gas is conducted into the working chamber 3, it could undesirably effect the temperature in the chamber 3. Therefore, the heating box 33 preheats the inert gas prior to the gas entering the chamber 3 (as shown in FIG. 2).

FIGS. 3(a)–3(c) show multiple views of a heating box 33 for preheating inert gas prior to the inert gas entering a working chamber according to an embodiment of the present invention. FIG. 3(a) is a top view, FIG. 3(b) is a frontal view and FIG. 3(c) is a side view of the heating box 33 according to a preferred embodiment. The heating box 33 includes two boxes, an inner airtight box 43 for heating inert gas and an outer box 44 for thermal insulation. In the inner box 43, there are three 350W heaters 39 installed. A thermal coupler 41 is placed into the box 43 for closed-loop temperature control. The air between the inner box 43 and the outer box 44 prevents the heat in the box 43 from scattering.

Inert gas used for oxidation prevention enters the heating box 43 from the entrance 40. The inert gas is heated as it passes through the heater 39 and is then released from the exit 42. The exit 42 is connected with the working chamber 3 at the junction 23 (shown in FIG. 2) from which the preheated inert gas $IG_O$ enters into the working chamber 3. The powder in chamber 3 can reach the desired temperature of 400° C. when the foregoing components are used as described hereinabove.

FIGS. 4(a)–4(c) show detailed views of a working chamber and an air-tight chamber according to an embodiment of the present invention. FIG. 4(a) is a cross-sectional frontal view, FIG. 4(b) is a top view and FIG. 4(c) is a side view of the two chambers. The working chamber and the airtight chamber help to maintain the temperature of the metal powder at the desired temperature/set point. The structure of the working chamber 3 and the airtight chamber 4 will now be described in further detail.

It is crucial to maintain the heat inside the chamber 3 from spreading because the working temperature is very high. First, efficient heat maintenance and/or insulation can reduce unnecessary energy consumption. Second, isolating the precise motion and electrical components, which are installed outside the chamber 3, from the high temperature zone can guarantee these components' proper working condition. Otherwise, the motion accuracy will be compromised, and the lifetime of the precision components will be largely reduced.

An inner part of the working chamber 3 is a stainless steel cover. There is a door 16 in front, and an opening 22 on the top of the chamber 3 for permitting the laser beam to enter. On the back wall of the chamber 3, there is an inlet 23 for the entrance of inert gas and an outlet 24 the exhaust of inert gas. A thermal insulation material 45, e.g., mica and/or its equivalent, having a thickness of approximately 20 mm, covers the exterior of the chamber 3. A working plate 29 forms the floor of the chamber 3 and a thermal insulation plate 30 is backed up beneath the working plate 29. Four thermal insulation bars 47 are put under the insulation plate 30, and a space with 20 mm thickness is therefore left between the insulation plate 30 and base plate 31 for further thermal insulation.

The airtight chamber 4 surrounds the working chamber 3. The chamber 4 is also made of stainless steel sheet, and is fixed on the base plate 31. The chamber 4 is formed of two parts 4a and 4b. Part 4a surrounds the working chamber 3, and part 4b covers the motion system of the scraper 6 and the secondary container 5. Air can flow between part 4a and part 4b. A window 22 is mounted on the top of the chamber 4 for permitting the $CO_2$ laser to pass through while still preventing gas within the chamber 4 from leakage. Inert gas is sealed in the chamber 4. A space is left between chamber 3 and chamber 4 that helps to achieve good thermal insulation effect.

Figure 5A:
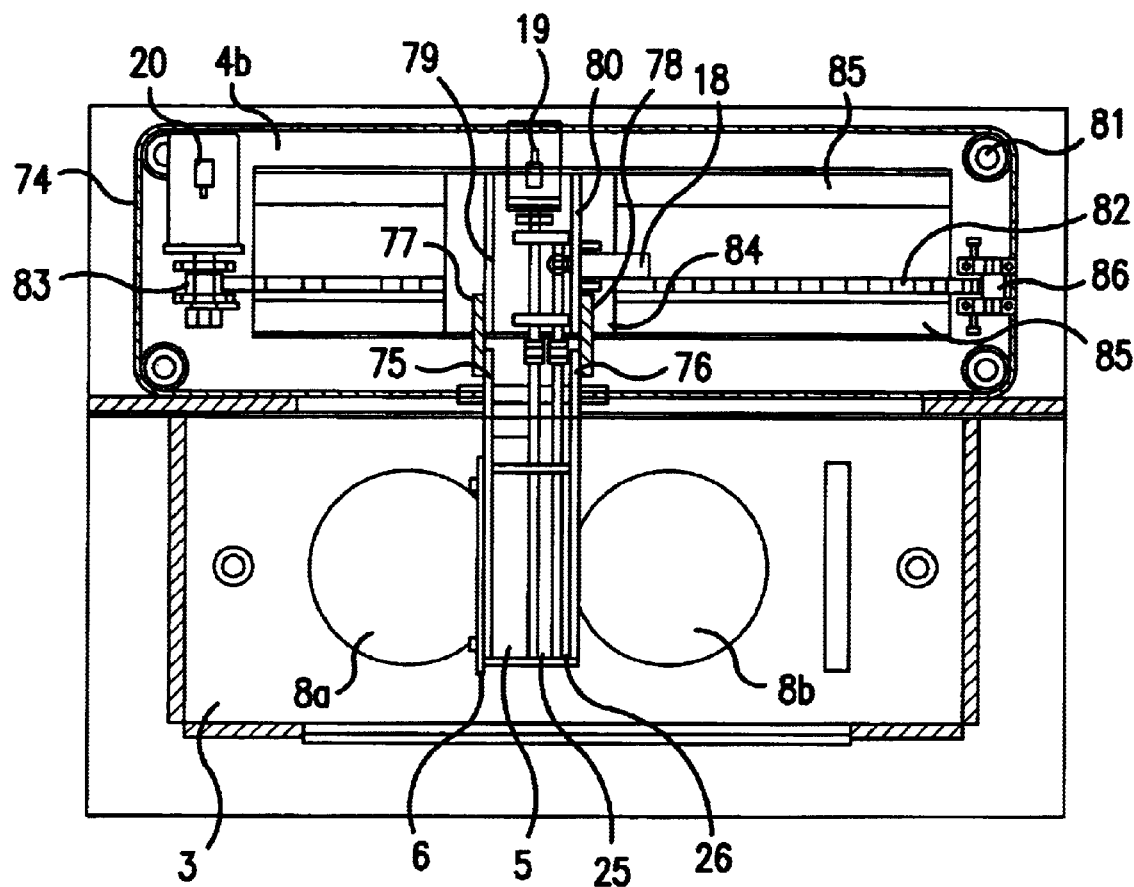
FIGS. 5(*a*)–5(*d*) show detailed views of the assembly of a feeding system and a dispensing mechanism for secondary powder according to an embodiment of the present invention.
Figure 5B:
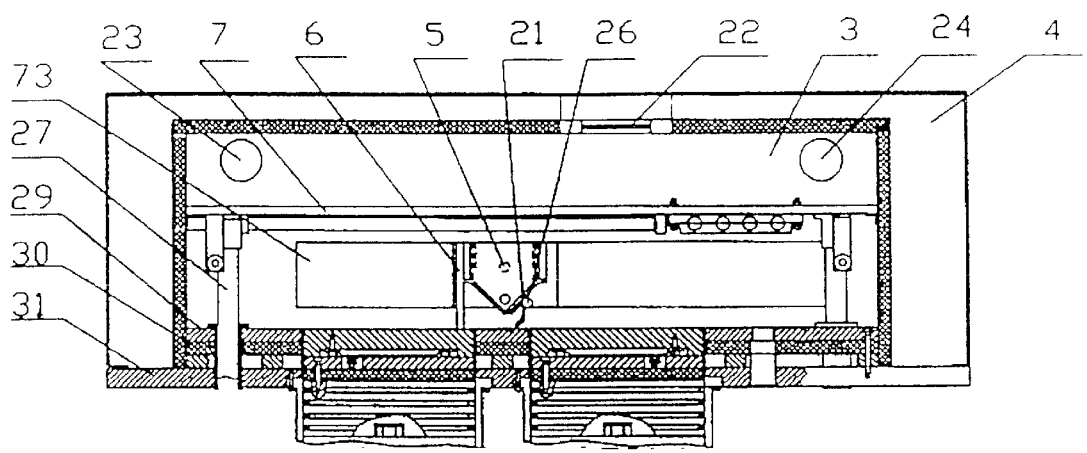
Figure 5C:
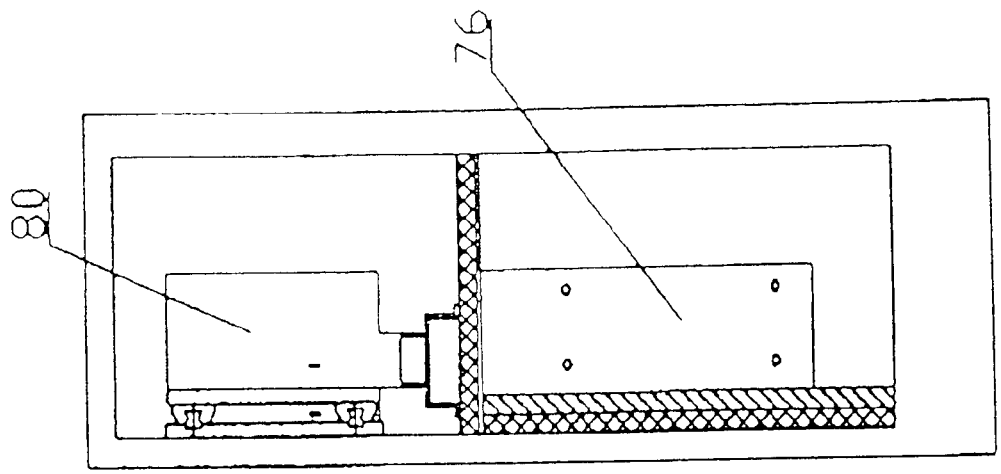
Figure 5D:
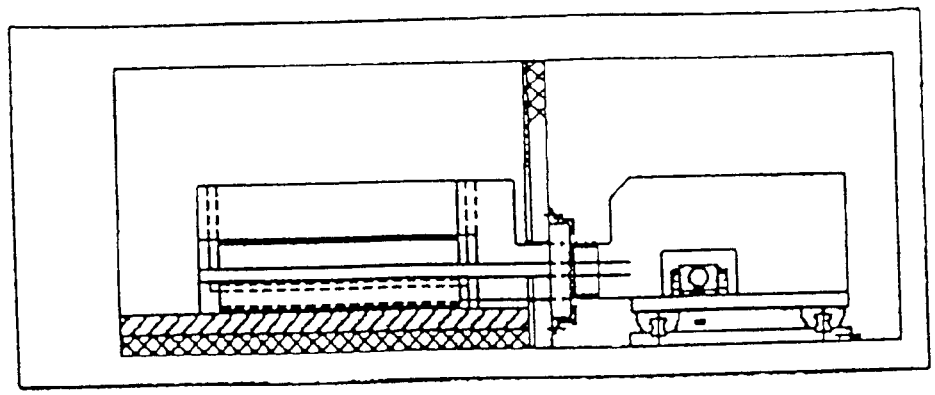
Figure 6B:
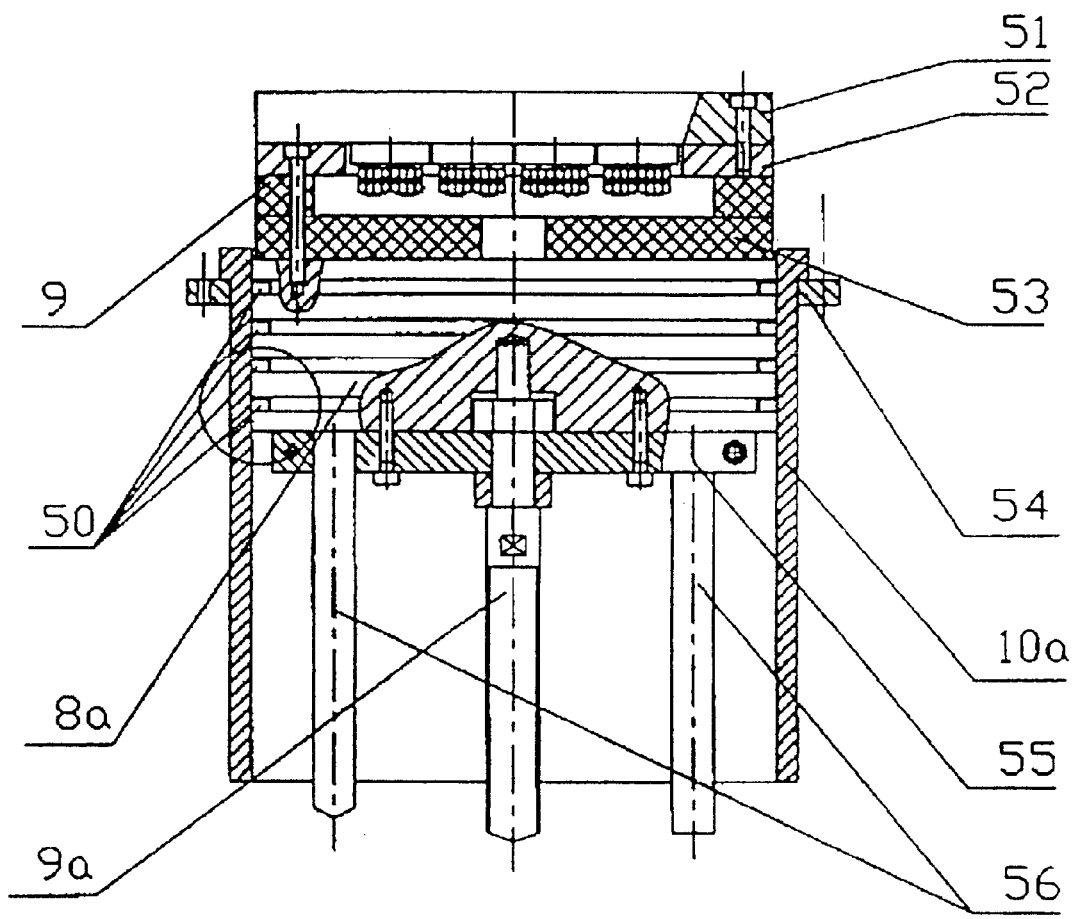
FIGS. 6(*a*)–6(*c*) show detailed views of a piston assembly according to an embodiment of the present invention.
Figure 6C:
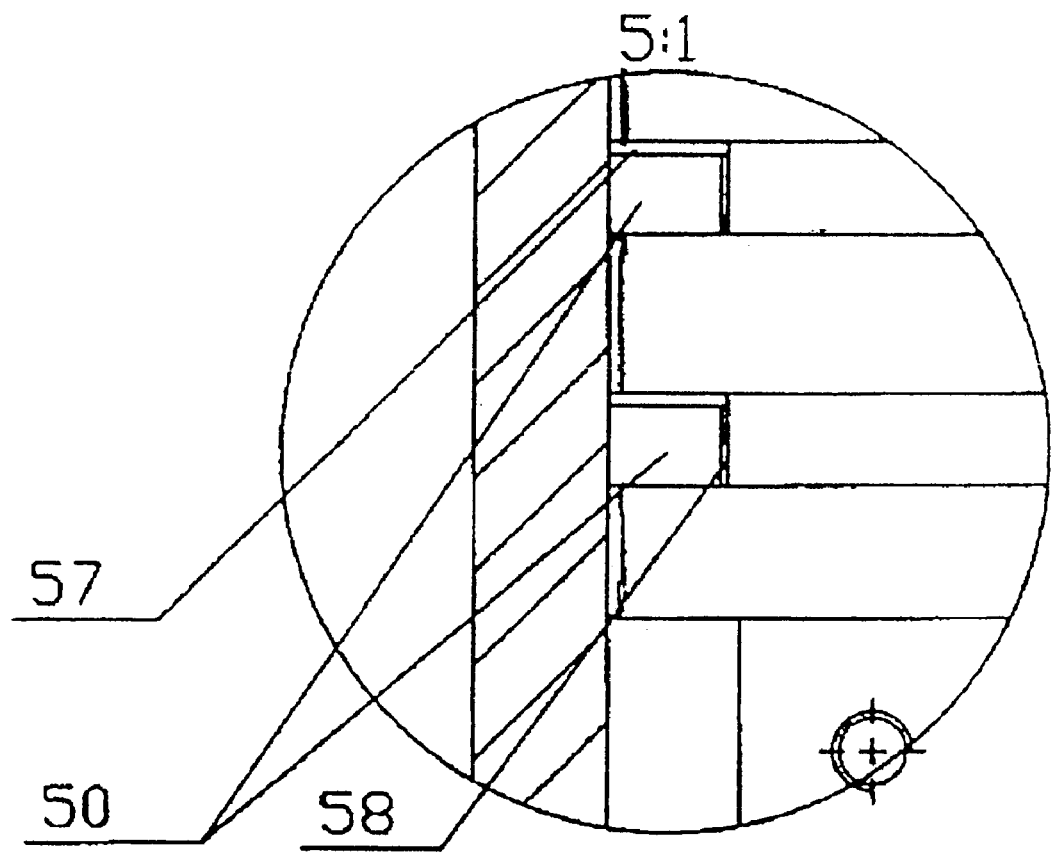

FIGS. 5(a)–5(d) show detailed views of the assembly of a feeding system and a dispensing mechanism for secondary powder according to an embodiment of the present invention. FIG. 5(a) is a top view, FIG. 5(b) is a partial, cross-sectional frontal view, FIG. 5(c) is a left side view and FIG. 5(d) is a right side view of the assembly of the feeding system and the dispensing mechanism.

The structure and motion system of the secondary powder container 5 will now be described in further detail with specific reference to FIGS. 5(a)–5(d). The secondary powder container 5 is open on the top. The powder can be added into the container 5 and absorb heat from the heating plate 7. The scraper 6 is fixed on one side 77 of the container 5. On the bottom of the container, there is a slot left for powder releasing. A worm shaft 25 inserts into the container 5 and can be rotated by the motor 19. The stirring action will help fine powder to release smoothly. A shutter 21, fixed on a shaft 26 driven by the gas cylinder 18, normally closes the slot. When the gas cylinder 18 is inflated, the shaft 26 is driven to rotate, and the shutter 21 installed on the shaft 26 will open.

The two side-walls 75 and 76 of the container 5 are connected with plates 79 and 80 respectively through thermal insulation plates 77 and 78 so as to avoid heat conduction to the motion parts. The plates 79 and 80 are fixed on moving platform 84 which is connected to belt 82. The belt 82 is twined on a pair of belt wheels 83 and 86 and the belt wheel 83 is connected with the step motor 20. Through the pair of belt wheels, the rotary action of the motor 20 is converted to the linear motion of the belt 82. The motion of the belt 82 drives the container 5 and scraper 6 back and forth together with the moving platform 84. The motion of the moving platform 84 is guided by a pair of guide rails 85.

There is a slot 73 on the back wall of the chamber 3 for the connection between the moving table 84 and the container 5. The slot 73 also gives a space for the relative motion between the motion unit and the chamber 3. The motion system, including components 19, 20, 82, 83, 85 and 86 installed on part 4b, should avoid working in a high temperature environment to guarantee the motion accuracy and increase the lifetime of precision components.

Air can flow from part 4a to part 4b through slot 73. Since the working area 4a is at a high temperature, the slot 73 should be opened as small as possible. A flexible thermal insulation belt 74 is connected with the container 5. The flexible thermal insulation belt 74 can move together with the container 5 and seals the slot 73 so as to prevent heat in area 4a from being transferred into area 4b through radiation and convection.

FIGS. 6(a)–6(c) show detailed views of a piston assembly according to an embodiment of the present invention. The 3D objective is built on the piston assembly and the unsintered powder is stored therein. FIG. 6(a) is a partial cross-sectional view, FIG. 6(b) is a second partial cross-sectional view and FIG. 6(c) is an enlarged view of a portion of FIG. 6(b) of the piston assembly according to an embodiment of the present invention.

FIG. 6 illustrates the structure of piston 8a and cylinder 10a. The temperature of the powder loaded in the cylinder 10a is about 400° C. Commonly used sealant, such as rubber or blanket, cannot withstand such a high temperature. If directly using the piston 8a to seal the powder, the rigid seal requires the piston 8a and cylinder 10a to be precision machined, and the tolerance must be tightly controlled. As piston 8a needs to move in the cylinder 10a, the alignment between the piston, cylinder and precise motion system is very difficult with the rigid seal. In addition, in a high temperature environment, the different thermal expansion of the cylinder 10a and the piston 8a may jam the motion of the piston.

In the preferred embodiment, piston rings 50 are used for maintaining a seal. The piston rings 50 are made from cast iron. The piston rings 50 can work properly in 800° C. temperature. Moreover, cast iron possesses good sand bearing, e.g. it is advantageous for use with seal powder material. The diameter of the piston ring is approximately 252 mm in a preferred embodiment. The existence of an oblique gap 59 in the piston ring and the elasticity of the material make the diameter of the piston ring adjustable. There are four grooves machined on the piston 8a, and four piston rings are put into respective grooves. The gaps of the four piston rings are arrayed in alternative positions. The diameter of the cylinder 10a, in which piston unit moves up and down, is approximately 250 mm in a preferred embodiment. When the piston 8a with piston rings 50 is put into the cylinder 10a, since the diameter of the piston rings 50 is larger than that of cylinder 10a, the piston rings 50 are forced to tighten up so as to match with the diameter of the cylinder 10a. Due to the elasticity, the piston rings 50 cling to the cylinder 10a to prevent the powder in the cylinder 10a from leakage.

FIGS. 7(a)–7(b) show a specially designed motion system which drives a piston moving up and down within a cylinder according to an embodiment of the present invention. FIG. 7(a) is a side and top view and FIG. 7(b) is an opposite side and partial top view of the motion system. The motion system of the piston unit will be described in greater detail hereinafter with specific reference to FIGS. 7(a)–7(b).

A ball screw unit 9, guide pin 28a and bush 28b connect piston unit 8a and motion system together. A ball screw nut 9b and a screw shaft 9a are applied here to precisely transfer a rotary action to linear motion. Servo motor 13a drives the ball screw nut 9b turning through a pair of precise gears 11a and 11b. Due to binding by component 62 in the vertical direction, the ball screw nut 9b only rotates without movement in this direction. Due to the rotating action, the screw nut 9b precisely drives the screw shaft 9a moving in the vertical direction. The linear motion of the piston unit is guided and supported by guide pin 28a and guide bush 28b, and the rolling match between the guide pin 28a and guide bush 28b makes the motion of piston steady and easy.

Returning to FIGS. 6(a)–6(b), there is a gap 57 in the axial direction and a gap 58 in the radial direction between piston ring 50 and the piston 8a. The gaps allow the piston rings 50 to move slightly within piston 8a. Even though the base plate 31 is not completely aligned with the motion system, as shown in FIG. 1, the piston rings 50 remain clinging to the cylinder 10a, and piston unit 8a can move smoothly within the cylinder 10a without affecting the seal effect.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sintering apparatus for producing a three dimensional metallic part from at least one metallic powder, said sintering apparatus comprising:
   a laser for selectively melting said at least one metallic powder;
   a scanner head mounted along a laser beam travel path, said scanner head focusing and directing a laser beam;
   a working chamber for high temperature sintering of said at least one metallic powder;
   an airtight chamber for maintaining an inert gas seal, said airtight chamber enclosing said working chamber;
   a secondary powder container;
   a scraper for delivering said at least one metallic powder to a target area;
   a heating system for heating said apparatus to a setting temperature;
   a cylinder and piston assembly for dispensing and building said at least one metallic powder to form said metallic part; and
   means for controlling said sintering apparatus.

2. The sintering apparatus according to claim 1, wherein said laser is a 200 W, $CO_2$ laser capable of being modulated on and off to produce the laser beam and being modulated within a selectable power range.

3. The sintering apparatus according to claim 1, wherein said laser has a wavelength of approximately 10590 nm.

4. The sintering apparatus according to claim 1, wherein said scanner head further includes a pair of mirrors driven by a respectively arranged pair of galvonmeters.

5. The sintering apparatus according to claim 1, wherein said working chamber includes an internal surface of stainless steel and an external surface having a thermal insulation material.

6. The sintering apparatus according to claim 1, wherein said airtight chamber includes an inert gas inlet and an inert gas outlet.

7. The sintering apparatus according to claim 1, said heating system farther comprising a radiant heater, strip heaters installed under a platform on which said powder is loaded, and a heating box through which an inert gas is preheated prior to entering into said working chamber.

8. The sintering apparatus according to claim 1, wherein said setting temperature is approximately 400° C.

9. The sintering apparatus according to claim 1, wherein said cylinder and piston assembly includes a dispensing cylinder, a building cylinder and a pair of respective power piston assemblies.

10. The sintering apparatus according to claim 9, wherein said cylinder and piston assembly includes a cylinder seal mechanism, said cylinder seal mechanism including piston sealing rings.

* * * * *